(12) United States Patent
Chen et al.

(10) Patent No.: US 7,136,648 B2
(45) Date of Patent: *Nov. 14, 2006

(54) CANDIDATE SYSTEM SEARCH AND SOFT HANDOFF BETWEEN FREQUENCIES IN A MULTI-CARRIER MOBILE COMMUNICATION SYSTEM

(75) Inventors: Tao Chen, San Diego, CA (US); Seyfollah Bazarjani, San Diego, CA (US); Edward G. Tiedemann, Jr., San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/456,218

(22) Filed: Jun. 6, 2003

(65) Prior Publication Data
US 2003/0211850 A1  Nov. 13, 2003

Related U.S. Application Data

(63) Continuation of application No. 09/413,648, filed on Oct. 6, 1999, now Pat. No. 6,606,485.

(51) Int. Cl.
*H04Q 7/20* (2006.01)
(52) U.S. Cl. .................. 455/442; 455/187.1; 455/435; 370/331
(58) Field of Classification Search ............. 455/552.1, 455/553.1, 132, 560, 561, 140, 187.1, 191.1, 455/323, 436–438, 442–443; 370/331, 332; 375/148, 136
See application file for complete search history.

(56) References Cited

U.S. PATENT DOCUMENTS

| | | | | |
|---|---|---|---|---|
| 5,101,501 A | * | 3/1992 | Gilhousen et al. | 455/442 |
| 5,758,266 A | * | 5/1998 | Kornfeld et al. | 455/442 |
| 6,035,197 A | * | 3/2000 | Haberman et al. | 455/436 |

* cited by examiner

*Primary Examiner*—Lester G. Kincaid
*Assistant Examiner*—James D Ewart
(74) *Attorney, Agent, or Firm*—Philip R. Wadsworth; Thien T. Nguyen; George J. Oehling (57) ABSTRACT

The present invention encompasses a mobile station comprising a transmitter for transmitting outgoing signals from the mobile station and a receiver for receiving incoming signals, the receiver coupled to the transmitter and having N sub receivers, where N is an integer greater than one and each of the N sub receivers may independently be tuned to a desired frequency. The present invention also encompasses a wireless communication system comprising a plurality of base stations, where each of the base stations transmits signals on at least one of a plurality of frequencies and a plurality of mobile stations, at least one of the plurality of mobile stations comprises a transmitter for transmitting signals to at least one of the plurality of base stations and a receiver coupled to the transmitter for receiving signals from at least one of the plurality of base stations, the receiver having N sub receivers, where N is an integer greater than one and each of the N sub receivers is independently tuned to a desired frequency.

21 Claims, 7 Drawing Sheets

| BS$_1$, f$_1$ | S$_1$ | S$_7$ | S$_{13}$ | S$_{19}$ |
|---|---|---|---|---|
| BS$_1$, f$_2$ | S$_2$ | S$_8$ | S$_{14}$ | S$_{20}$ |
| BS$_1$, f$_3$ | S$_3$ | S$_9$ | S$_{15}$ | S$_{21}$ |
| BS$_3$, f$_1$ | S$_4$ | S$_{10}$ | S$_{16}$ | S$_{22}$ |
| BS$_3$, f$_2$ | S$_5$ | S$_{11}$ | S$_{17}$ | S$_{23}$ |
| BS$_3$, f$_3$ | S$_6$ | S$_{12}$ | S$_{18}$ | S$_{24}$ |

→ TIME

FIG. 9

| BS$_1$, f$_1$ | S$_1$ | S$_4$ | S$_7$ | S$_{10}$ |
|---|---|---|---|---|
| BS$_2$, f$_1$ | S$_1$ | S$_4$ | S$_7$ | S$_{10}$ |
| BS$_3$, f$_4$ | S$_2$ | S$_5$ | S$_8$ | S$_{11}$ |
| BS$_4$, f$_4$ | S$_2$ | S$_5$ | S$_8$ | S$_{11}$ |
| BS$_3$, f$_6$ | S$_3$ | S$_6$ | S$_9$ | S$_{12}$ |
| BS$_4$, f$_6$ | S$_3$ | S$_6$ | S$_9$ | S$_{12}$ |

→ TIME

CANDIDATE SYSTEM SEARCH AND SOFT HANDOFF BETWEEN FREQUENCIES IN A MULTI-CARRIER MOBILE COMMUNICATION SYSTEM

CLAIM OF PRIORITY UNDER 35 U.S.C. §120

The present Application for Patent is a Continuation Application claiming priority to patent application Ser. No. 09/413,648, entitled "Candidate System Search and Soft Handoff Between Frequencies in a Multi-Carrier Mobile Communication System" filed Oct. 6, 1999, now U.S. Pat. No. 6,606,425 B1, having a common assignee with the present application.

BACKGROUND OF THE INVENTION

1. Field of the Invention

The present invention generally relates to mobile communication systems. More specifically, the present invention relates to mobile communication systems in which mobile stations can receive and demodulate signals transmitted on more than one frequency.

2. Description of the Related Art

Figure 1:
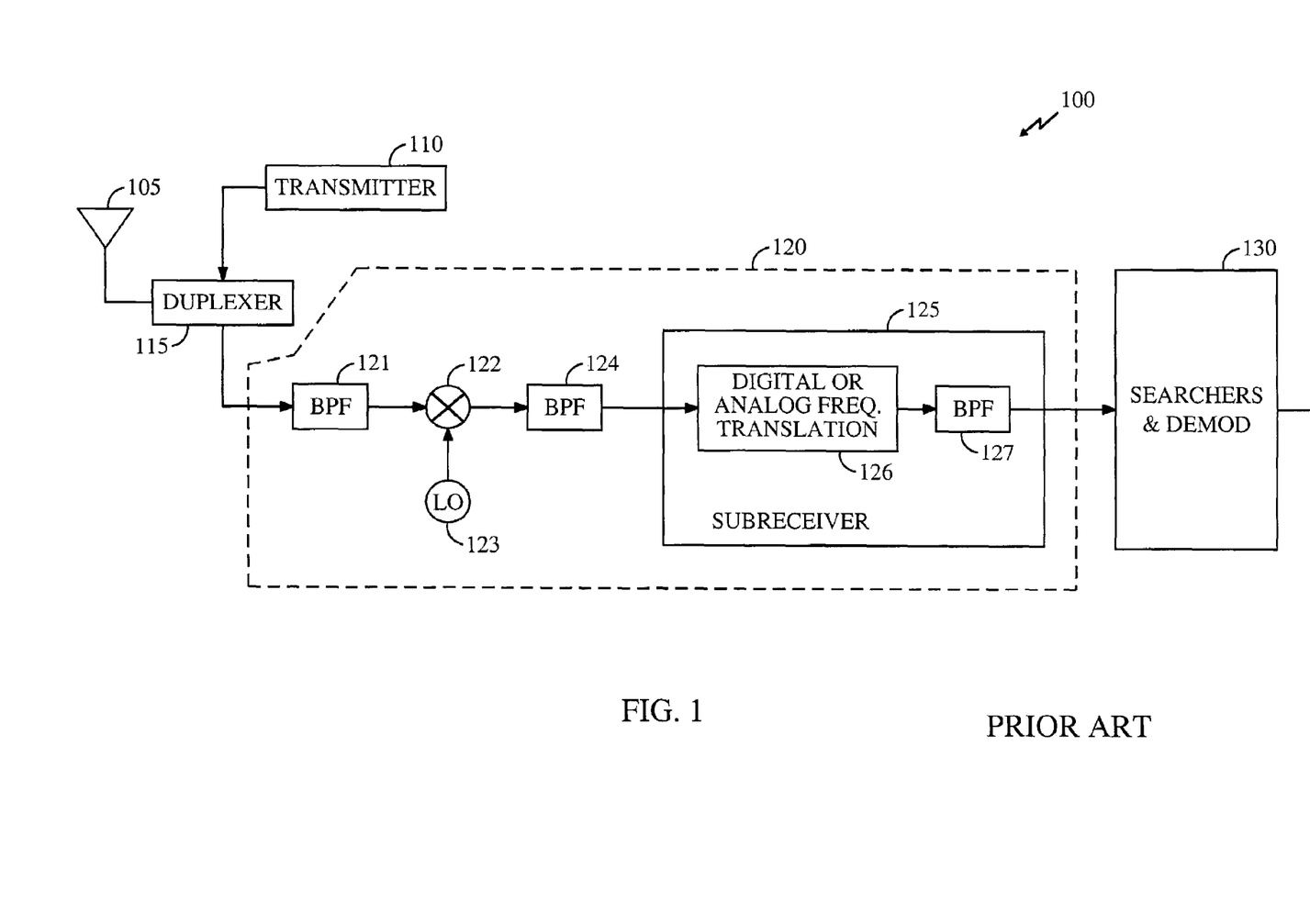
FIG. 1 is a general block diagram of an earlier mobile station.

FIG. 1 shows a general block diagram of an earlier mobile station 100 used in a cellular telephone system, such as a code division multiple access (CDMA) cellular telephone system. U.S. Pat. No. 5,109,390, which has been assigned to the assignee of the present invention and which is incorporated herein by reference, discloses a schematic diagram of an example of a CDMA cellular telephone system and a block diagram of a mobile station used in such a system. Referring to FIG. 1, mobile station 100 comprises an antenna 105 for communicating with base stations, a transmitter 110 for transmitting signals from the mobile station 100, a receiver 120 for receiving signals, a searchers and demodulators unit 130, and a duplexer 115 coupled to the antenna 105, transmitter 110, and receiver 120 for properly routing outgoing signals from the transmitter 110 to antenna 105 and incoming signals from antenna 105 to receiver 120. Duplexer 115 is a conventional duplexer that may be a full duplexer, which allows transmitting and receiving signals simultaneously, or a half duplexer, which allows for only one of transmitting or receiving signals at any given time.

Receiver 120 comprises a first band pass filter (BPF) 121 coupled to duplexer 115, a mixer 122 coupled to the first BPF 121, a local oscillator (LO) 123 coupled to mixer 122, a second BPF 124 coupled to mixer 122, and a subreceiver 125 coupled to the second BPF 124. Subreceiver 125 includes a frequency translator 126, which may be either a digital or analog frequency translator, and a third BPF 127.

Duplexer 115 routes incoming signals to the first BPF 121 which in turn sends a band passed version of the incoming signals to mixer 122. Mixer 122 also receives a second input from LO 123. The output of mixer 122 is sent to the second BPF 124 which sends a band passed version of its input signal to subreceiver 125. Frequency translator 126 receives the output of the second BPF 124 and shifts the received signal in the frequency domain such that its output is centered around a desired frequency, namely the frequency on which signals are carried as they are transmitted between the mobile station 100 and a base station with which the mobile station 100 is in communication. The third BPF 127 receives the output of frequency translator 126 and outputs a band passed version of its input. The third BPF 127 has a band pass of 1.25 MHz and is centered around the frequency on which signals are carried as they are transmitted between the mobile station 100 and the base station with which the mobile station 100 is in communication. The output of third BPF 127 is transmitted to the searchers and demodulators unit 130. The demodulators in searchers and demodulators unit 130 demodulate the signals on incoming waveforms. Thereafter, the demodulation fingers of the demodulators remove the codes of a communication code channel, such as Walsh codes and pseudorandom noise (PN) codes, from the demodulated signals, and combine the removed codes. The searchers in the searchers and demodulators unit 130 search for the existence of a structured waveform, such as codes of a communication code channel, e.g., Walsh codes or PN codes. Examples of searchers and demodulators are disclosed in U.S. Pat. Nos. 5,103,459, 5,490,165, and 5,506,865, all of which have been assigned to the assignee of the present invention and are incorporated herein by reference. It is to be noted that in some of the above referenced patents, a digital receiver or a digital data receiver may refer to a demodulator or a combination of a searcher and demodulator(s). Similarly, an analog receiver may refer to what in the present application is referred to as receiver 120 or an equivalent thereof.

As the subreceiver is tuned to only one frequency at any given time, the mobile station can be in communication only with a base station transmitting signals on the frequency range to which the mobile station is tuned. This limitation with respect to the frequency to which the mobile station is tuned causes the mobile station and the wireless communication system within which the mobile station operates to suffer from several disadvantages. First, the mobile station cannot be in soft handoff between two different frequencies. Second, the mobile station cannot monitor or search for pilots at more than one frequency at any given time. Third, in the idle state, the mobile station cannot monitor or search for pages at more than one frequency at any given time.

SUMMARY OF THE INVENTION

The present invention overcomes the aforementioned disadvantages by using N (where N is an integer greater than one) sub receivers in the receiver of the mobile station. Each of the sub receivers in the mobile station of the present invention may be independently tuned to a particular frequency. As a result of having multiple sub receivers that may be independently tuned to different frequencies, the mobile station of the present invention can simultaneously receive signals on more than one frequency from different base stations or from different sectors of one base station. This allows the mobile station (1) to be in (a) soft handoff between two different frequencies which are received from different base stations or (b) softer handoff between two different frequencies which are received from different sectors of the same base station or (c) soft softer handoff between multiple frequencies which are received from different base stations, where in the case of at least one base station, multiple frequencies are received from different sectors of the same base station, (2) to be in communication with one base station at a first frequency while at the same time searching for and monitoring pilots at other frequencies with little or no degradation to the forward or reverse links with the base station with which it is in communication, and (3) to simultaneously search for and monitor pages at more than one frequency in the idle state, i.e., when the mobile station is not on a traffic channel.

In order to provide these and other benefits, the mobile station comprises: a transmitter for transmitting outgoing signals from the mobile station; and a receiver for receiving incoming signals, the receiver coupled to the transmitter and having N sub receivers, where N is an integer greater than one and each of the N sub receivers may independently be tuned to a desired frequency.

In one embodiment, the receiver comprises three sub receivers and each of the three sub receivers has a frequency band that is approximately 1.25 MHz wide.

In another embodiment, the receiver comprises two sub receivers. In a first two subreceiver embodiment, the first subreceiver has a frequency band that is two times as wide in the frequency domain as the frequency band of the second subreceiver. In a second two subreceiver embodiment, the first subreceiver has a frequency band that is three times as wide in the frequency domain as the frequency band of the second subreceiver.

The present invention also encompasses a wireless communication system comprising: (1) a plurality of base stations, where each of the base stations transmits signals on at least one of a plurality of frequencies; and (2) a plurality of mobile stations, where at least one of the plurality of mobile stations comprises: (a) a transmitter for transmitting signals to at least one of the plurality of base stations; and a receiver coupled to the transmitter for receiving signals from at least one of the plurality of base stations, the receiver having N sub receivers, where N is an integer greater than one and each of the N sub receivers is independently tuned to a desired frequency.

In one embodiment, a first base station of the plurality of base stations transmits signals on a first frequency using a first code channel and a second base station of the plurality of base stations transmits signals on the first frequency using a second code channel that is different from the first code channel.

DETAILED DESCRIPTION OF THE PREFERRED EMBODIMENT

Figure 2:
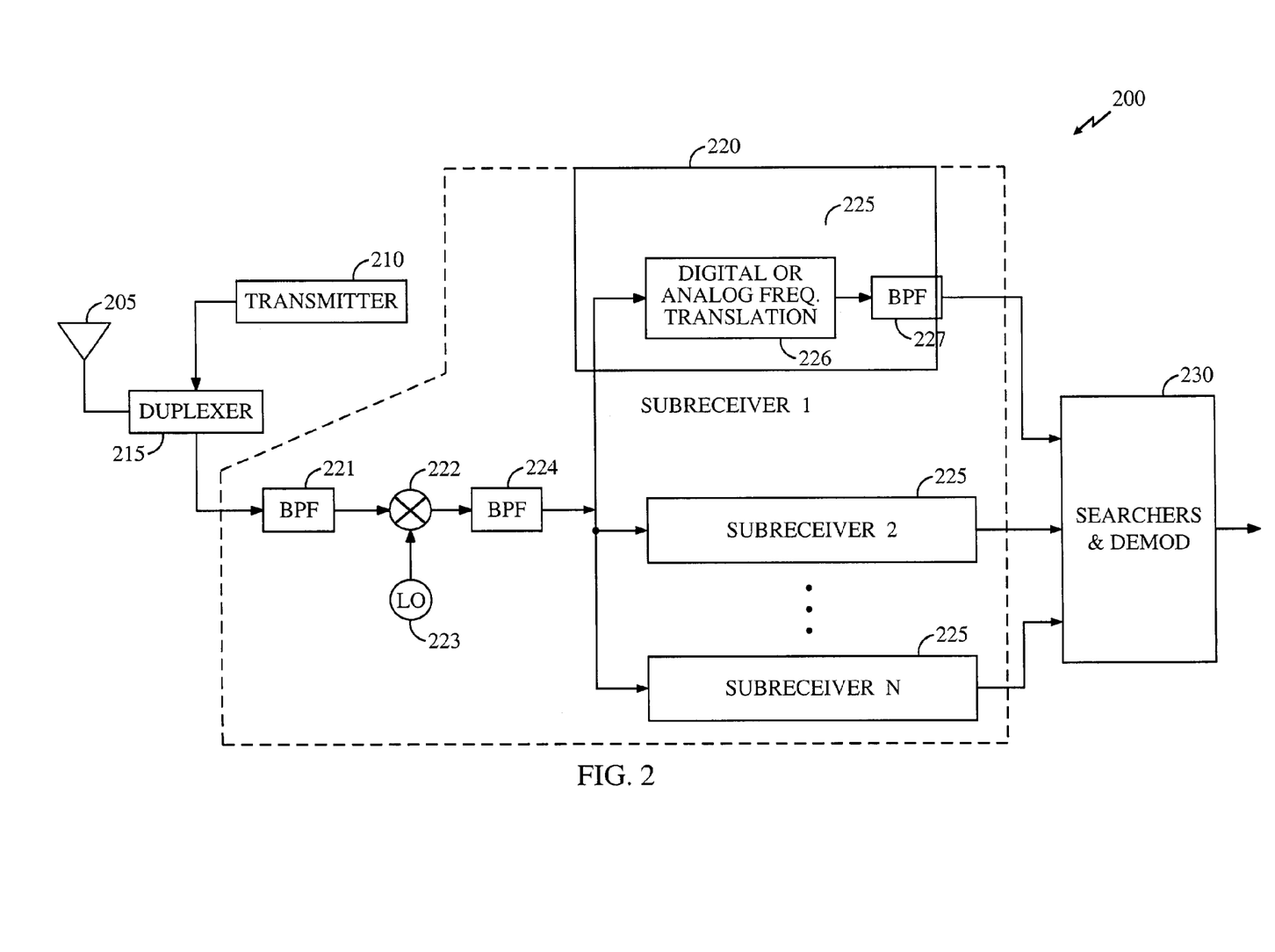
FIG. 2 is a general block diagram of the mobile station of the present invention.

FIG. 2 shows a general block diagram of the mobile station of the presently preferred embodiment of the invention. Mobile station 200 comprises elements contained in mobile station 100. For each element in mobile station 200 having a corresponding element in mobile station 100, a reference number has been selected by adding 100 to the reference number of the corresponding element in mobile station 100. For example, the duplexer in mobile station 200 is referenced as duplexer 215, where 215 is the sum of 100 and the reference number 115 for duplexer 115 in mobile station 100. As the elements in mobile station 200 having corresponding elements in mobile station 100 are well known to those skilled in the art and have been described above, those elements in mobile station 200 will not be further described herein in order to concentrate on the inventive features of the mobile station 200 of the present invention. Similarly, other elements commonly used in mobile stations have been omitted from the block diagrams of mobile stations 100 and 200 since such elements are well known to those skilled in the art.

As can be seen in FIGS. 1 and 2, mobile station 200 contains elements in addition to those that have corresponding elements in mobile station 100. For example, unlike receiver 120, in mobile station 100, which has only one subreceiver 125, receiver 220 in mobile station 200 comprises N sub receivers 225, where N is an integer greater than one. Each of the N sub receivers 225 may be independently tuned to a different frequency to search for, monitor, and demodulate signals sent on different frequencies. The use of multiple sub receivers which may be independently tuned to different frequencies allows mobile station 200 to simultaneously receive signals on more than one frequency from different base stations or different sectors of one base station.

In some embodiments, the searchers and demodulators unit 230 may contain additional demodulator BPF's (not shown) for further filtering signals received from BPF's 227 in receiver 220. A demodulator would include demodulator BPF's when the bandwidth of the BPF 227 from which the demodulator receives signals is sufficiently wide so as to contain more than one frequency band on which signals are commonly transmitted in a wireless communication system. In a wireless communication system, in accordance with a presently preferred embodiment of the invention, a frequency band of 1.25 MHz is commonly used to transmit signals. Therefore, when more than one 1.25 MHz band may be fitted into the frequency band of the feeding BPF 227, then the number of 1.25 MHz bands that may be fitted into the frequency band of the feeding BPF 227 determines the number of demodulator BPF's that should be used in a demodulator receiving signals from the feeding BPF 227. It is to be noted that the above method for determining the number of demodulator BPF's to be used in a demodulator can be applied to systems using a frequency band different from a 1.25 MHz band for transmitting signals. For such systems, the frequency band commonly used in those systems, instead of a band of 1.25 MHz, will be used to determine the number of demodulator BPF's (not shown) to be used in the demodulator.

In one embodiment, N is equal to three, in which case mobile station 200 comprises three sub receivers. In one embodiment having three sub receivers, each of the sub receivers is tuned to a different frequency and filters signals within a bandwidth of approximately 1.25 MHz. In this embodiment, the demodulators do not need to have any demodulator BPF's as the bandwidth of each of BPF's 227 is equal to that of frequency bands on which signals are commonly transmitted in a wireless communication system.

In a second embodiment, mobile station 200 comprises two sub receivers. In a first embodiment of a two subreceiver mobile station, one subreceiver filters signals at a bandwidth of approximately 3.75 MHz while the other subreceiver filters signals at a bandwidth of approximately 1.25 MHz. In the above mentioned first embodiment where the BPF 227 of one subreceiver has a bandwidth of approximately 3.75 MHz, the demodulator coupled to the 3.75 MHz BPF 227 includes three demodulator BPF's (not shown) for subdividing the signals received from the 3.75 MHz BPF 227 into three separate signals each of which is in one of three adjacent bands having a bandwidth of approximately 1.25 MHz. In one embodiment, the band for the 1.25 MHz BPF 227 may correspond to one of the three 1.25 MHz subbands of the 3.75 MHz BPF 227. In such an embodiment, the 3.75 MHz BPF 227 and the 1.25 MHz BPF 227 together include three demodulator BPF's (not shown) for subdividing signals received from the 3.75 MHz BPF 227 and the 1.25 MHz BPF 227 into three separate signals each of which is in one of three adjacent bands having a bandwidth of approximately 1.25 MHz. In a second embodiment of a two subreceiver mobile station, one subreceiver filters signals at a bandwidth of approximately 2.5 MHz while the other subreceiver filters signals at a bandwidth of approximately 1.25 MHz. In the above mentioned second embodiment where the BPF 227 of one subreceiver has a bandwidth of approximately 2.5 MHz, the demodulator coupled to the 2.5 MHz BPF 227 includes two demodulator BPF's (not shown) for subdividing the signals received from the 2.5 MHz BPF 227 into two separate signals each of which is in one of two adjacent bands having a bandwidth of approximately 1.25 MHz.

In one embodiment, the BPF's 227 may comprise surface acoustic wave (SAW) filters, which are well known to those skilled in the art. It is to be noted that the BPF's used in the present invention are not limited to SAW filters, but may instead be any BPF used in the art, such as other types of analog filters (e.g., cascaded lumped elements filters, crystals) or digital filters (e.g., finite impulse response (FIR) filters).

Figure 11:
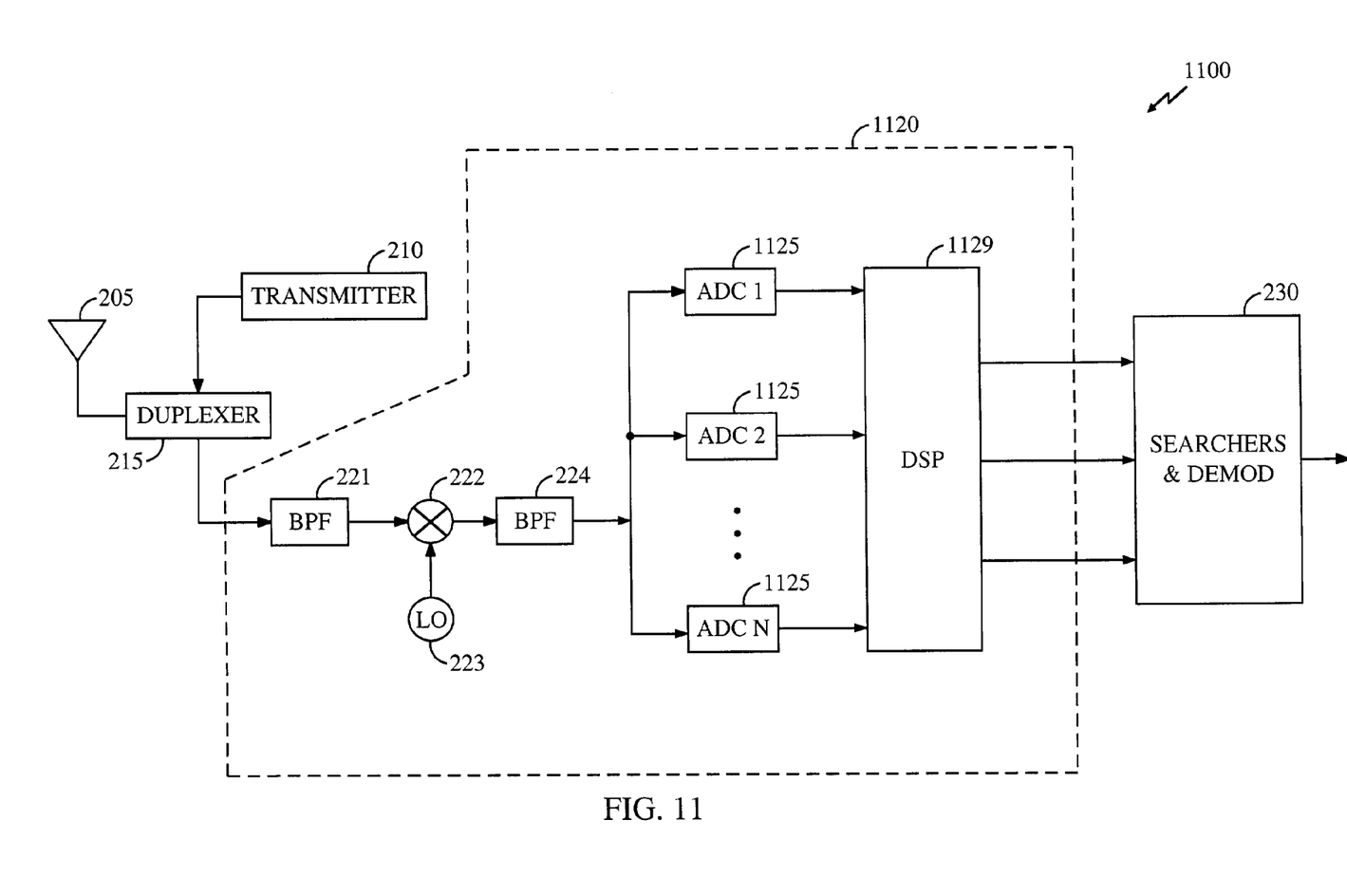
FIG. 11 is a general block diagram of an embodiment of the multiple subreceiver mobile station of the present invention.

FIG. 11 is a general block diagram of an embodiment of the multiple subreceiver mobile station of the present invention. In mobile station 1100 of FIG. 11, each of analog to digital converters (ADC's) 1125, either alone or in combination with digital signal processor 1129, may be thought of as a subreceiver of receiver 1120. Thus, for example, the Nth ADC 1125 or the Nth ADC 1125 in combination with DSP 1129 may be thought of as the Nth subreceiver. Although in the embodiment shown in FIG. 11, there is one DSP 1129 corresponding to all ADC's 1125, in an alternative embodiment it is conceivable that each ADC 1125 would be associated with a separate corresponding DSP that is not shared with other ADC's 1125.

Each ADC 1125 may be independently tuned to sample a portion of the incoming signal frequency band into digital signals. Thus, the first ADC 1125 may be tuned to sample incoming signals of a frequency f1 while the Nth ADC 1125 may be tuned to sample incoming signals of frequency fN, where f1 and fN are different frequencies and may be the center frequencies for adjacent or non-adjacent frequency bands.

In one embodiment, N is equal to three and, therefore, mobile station 1100 comprises three sub receivers. In one embodiment having three sub receivers, each of the sub receivers is tuned to a different frequency and filters signals within a bandwidth of approximately 1.25 MHz. Mobile station 1100 may also have the different combinations of number of sub receivers, subreceiver bandwidths and subreceiver frequencies (in other words, frequencies to which each subreceiver is tuned) as those described in relation to mobile station 200.

Moreover, the ADCs 1125 may be regular analog to digital converters or sigma-delta modulators. The sigma-delta modulator may be a bandpass sigma-delta modulator when the signal is an intermediate frequency (IF) signal or a low pass sigma-delta modulator when the incoming signal is a base band (i.e., an unmodulated, lower frequency) signal. U.S. Pat. No. 6,005,506, issued Dec. 12, 1999 entitled "Receiver With Sigma-Delta Analog-To-Digital Converter" and U.S. Pat. No. 5,982,315, issued Nov. 9, 1999 entitled "Multi Loop Sigma-Delta Analog-To-Digital Converter" which has been assigned to the assignee of the present invention and is herein incorporated by reference provides greater detail about the sigma-delta modulators that may be used in the present invention.

DSP 1129 receives digital signals from the ADCs 1125. Thereafter, it band pass filters each of the signals from the ADCs 1125. DSP 1129 may also mix the input digital signals to baseband and then use a low pass, rather than a band pass, filter for filtering the digital signals. If the ADC 1125 oversamples the analog signals, in other words samples the analog signals at a rate greater than the Nyquist rate or chip rate, then the DSP 1129 may also decimate the data from the oversampled data rate to the Nyquist rate or chip rate. Moreover, the DSP 1129 extracts the I (in-phase) and Q (quadrature-phase) components of the signals. In other words, the signals sent form the DSP 1129 to searchers and demodulators 230 are the I and Q components of the input signal. U.S. Pat. No. 6,389,069 B1, issued May 14, 2002 entitled "A Low Current Programmable Digital Filter" which has been assigned to the assignee of the present invention and is herein incorporated by reference provides greater detail about the aforementioned functions of DSP 1129.

As noted above, the block diagrams of the mobile stations 100 and 200 do not show some elements commonly used in mobile stations since those elements are well known to those skilled in the art. Similarly, the block diagram of mobile station 1100 also does not show some elements commonly used in mobile stations. For example, FIGS. 1, 2, and 11 do not show a low noise amplifier (LNA) and an automatic gain control (AGC) that are commonly used in mobile stations. Those skilled in the art, know that an LNA amplifies signals received from duplexers 115 and 215 before those signals are sent to BPF's 121 and 221, respectively. Similarly, those skilled in the art know that preferably an AGC would control the amplitude of signals output by BPF's 124 and 224 before they are sent to sub receivers 125 and 225 (ADC 1125 in the case of mobile station 1100). Those skilled in the art also know that the adjustment of the AGC is controlled based on the signal strength of the signals output by the sub receivers.

Those skilled in the art would also realize that if the frequency translator 226 in mobile station 200 (or frequency translator 126 in mobile station 100) is digital, then the signals received thereby are digitized somewhere along the signal path prior to being frequency translated. Similarly, those skilled in the art would realize that if BPF 227 in mobile station 200 (or BPF 127 in mobile station 100) is analog then the signal output thereby is converted to a digital signal for processing by the searchers and demodulators unit 230 (or searchers and demodulators unit 130 in mobile station 100). Similarly, those skilled in the art would realize that the receiver (of mobile stations 100 and 200) may include means for extracting the I and Q components of signals prior to sending those signals to the demodulators and searchers unit.

The ability to simultaneously receive signals on more than one frequency allows the mobile station of the present invention (1) to be in (a) soft handoff between two different frequencies which are received from different base stations or (b) softer handoff between two different frequencies which are received from different sectors of the same base station or (c) soft softer handoff between multiple frequencies which are received from different base stations, where in the case of at least one base station, multiple frequencies are received from different sectors of the same base station, (2) to be in communication with one base station at a first frequency while at the same time searching for and monitoring pilots at other frequencies with little or no degradation to the forward or reverse links with the base station with which it is in communication, and (3) to simultaneously search for and monitor pages at more than one frequency in the idle state, i.e., when the mobile station is not on a traffic channel. Additionally, the ability to simultaneously receive signals on more than one frequency allows the mobile station of the present invention to search for signals in different formats and technologies, such as, for example, Advanced Mobile Phone Service (AMPS), narrowband AMPS (NAMPS), and Global System for Mobile (GSM).

In the search mode, while mobile station 200 (or mobile station 1100) is on a traffic channel, i.e., in continuous two-way communication with one or more "anchor" base stations, it can tune one or more of its sub receivers 225 (or ADC's 1125) and one or more of the base band searchers in searchers and demodulators unit 230 to candidate frequencies to search for signals from other base stations or sectors of other base stations, if sectorized antennas are used. As is known in the art, an anchor base station is a base station with which a mobile station is in continuous two-way communication. Each of the one or more sub receivers and base band searchers searching for signals from other base stations can be tuned to one of the multi-carrier frequencies of candidate base stations to detect the existence of the forward link signal by measuring the forward link signal power level for the respective base station and correlating with the pilot channel, by detecting digital control channels of analog cellular systems, or by detecting forward link overhead channels. This search helps the determination of the coverage of the mobile station by different base stations and the proper timing for inter-frequency handoff. When the mobile station is executing this search, one or more sub receivers and their corresponding base band searchers and demodulators are still receiving the forward traffic channel. Moreover, the mobile station 200 (or mobile station 1100) continues transmitting to the anchor base station(s) without interruption, thus ensuring the reverse link to be working properly.

During system determination (i.e., when the mobile station is determining which wireless communication system it is near and which base station it can communicate with), the multiple sub receivers of the mobile station can be used in parallel to detect forward links signals from multiple base stations. Generally, parallel detection of forward link signals allows for quicker system determination than sequential (or serial) detection of forward link signals. In an idle state (i.e., when the mobile station is not in two way continuous communication with one or more anchor base stations), the different sub receivers of the mobile station can be tuned to receive from multiple base stations on the same or different frequencies to improve the paging channel reliability. The mobile station searches for and monitors the paging channels from multiple base stations using different portions of its RF front end (i.e., sub receivers) and base band demodulator. As the mobile station and its propagation environment changes, the relative strengths of these paging channels may vary over time. In accordance with the present invention, the mobile station can monitor one or more paging channels while searching for the others. A portion of the RF front end of the mobile station can be tuned to a new frequency or frequencies so the searcher(s) can find strong pilot channels on a new frequency or frequencies different from those that the mobile station is currently monitoring. If strong energy is detected or high correlation indicates the existence of a forward link signal at the new frequency or frequencies, then the mobile station can choose to monitor the target base station or base stations, i.e., the base station or base stations transmitting the pilot channels on the new frequency or frequencies.

Figure 3:
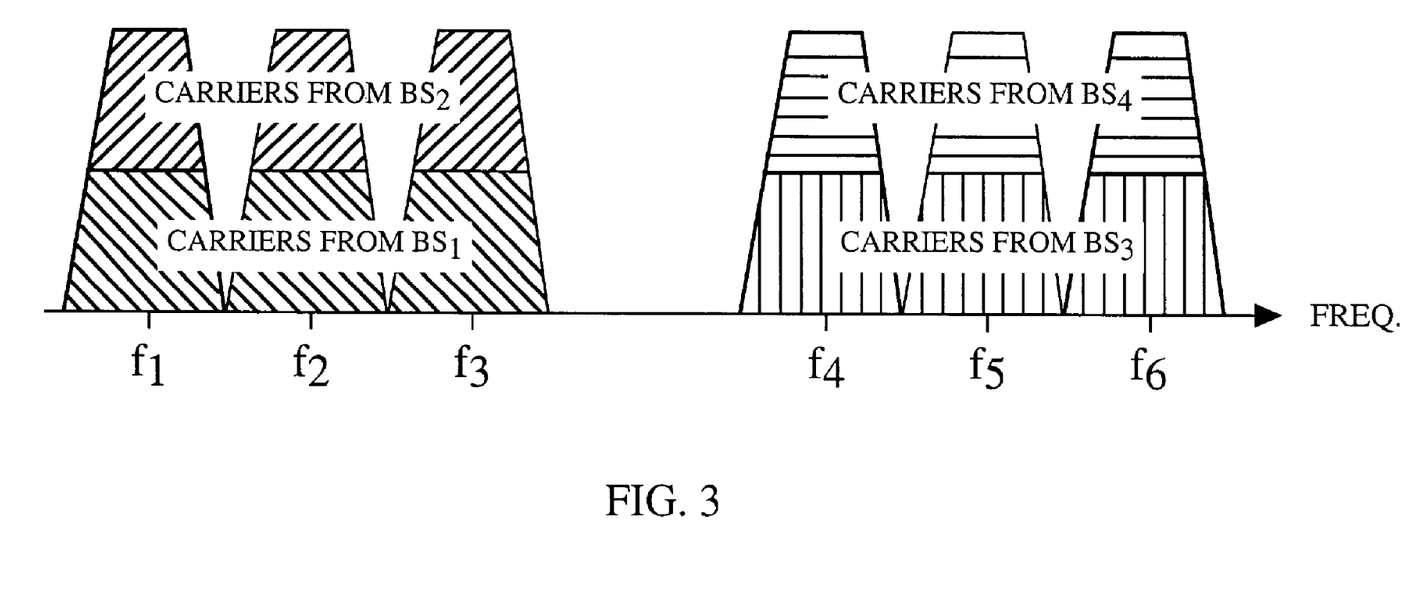
FIG. 3 is a graph on the frequency domain of multiple frequencies and multiple code channels used for transmitting signals in the wireless communication system of the present invention.

FIG. 3 is a graph illustrating a frequency domain representation of multiple frequencies and multiple code channels used for transmitting signals in the present embodiment of the wireless communication system of the invention. In the example shown in FIG. 3, there are six different frequencies f1, f2, f3, f4, f5, and f6 used for communicating between base stations and mobile stations. In FIG. 3, the frequency bands centered around each of f1, f2, f3, f4, f5, and f6 are substantially equal. Furthermore, the frequency bands in which f1, f2, and f3 are centered are adjacent to each other. Similarly, the frequency bands in which f4, f5, and f6 are centered are adjacent to each other. However, the frequency bands in which f3 and f4 are centered are not adjacent to each other. Base station one (BS1) and base station two (BS2) transmit signals at frequencies f1, f2, and f3 using first and second code channels, respectively. Similarly, base station three (BS3) and base station four (BS4) transmit signals at frequencies f4, f5, and f6 using third and fourth code channels, respectively. Therefore, as can be seen from the above example, by using different code channels, more than one base station may transmit signals at a given frequency. In FIG. 3, signals on frequencies f1, f4, and f6 which are shown in darker outlines are intended for a first mobile station whereas signals carried on frequencies f2, f3, and f5 are intended for a second mobile station.

Generally, each mobile station may receive code symbols on up to M code channels, where M is an integer. More specifically, each demodulation finger of the mobile station may receive code symbols on up to M code channels. Additionally, each mobile station may receive code symbols on up to N frequencies, where, as stated above, N is an integer greater than one and represents the number of sub receivers within the mobile station. N also represents the number of carriers intended for reception by a given mobile station within the system. In the example shown in FIG. 3, M is at least six and N is equal to three.

Figure 10:
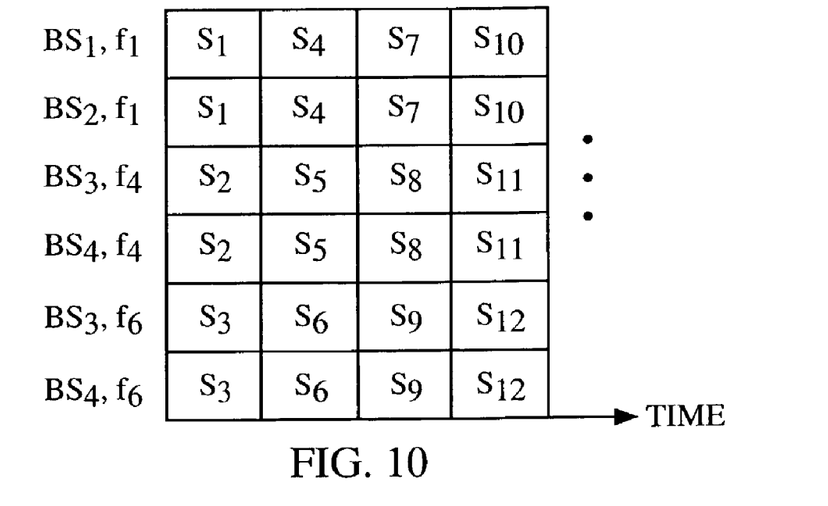

The code symbols intended for a target mobile station may be demultiplexed (i.e., sent as parallel substreams) on the six different code channels on the three frequencies which carry signals intended for the target mobile station. Some or all of the substreams may be duplicated on the six different code channels on the three different frequencies which carry signals intended for the target mobile station. For example, in FIG. 3, code symbols intended for the first mobile station may be demultiplexed or duplicated on the six code channels on frequencies f1, f4, and f6. The code symbols may also be sent in any combination of demultiplexing and repetition. Some combination of demultiplexing and repetition, an example of which is shown in FIG. 10, may be used to avoid interference and fading or to balance the load of the different carriers and base stations.

The mobile station multiplexes the demultiplexed symbols while its maximal ratio combines the repeated code symbols from different multipath components and different code channels on the carriers that it is receiving. Thereafter, the demultiplexed and combined code symbols are sent to the decoder (not shown) of mobile station 200 (or mobile station 1100).

Some code channels, such as the six code channels in FIG. 3, might not carry any code symbols for a target mobile station. For example, some of the six code channels on frequencies f1, f4, and f6 might not carry any code symbols for the first mobile station.

Figure 4:
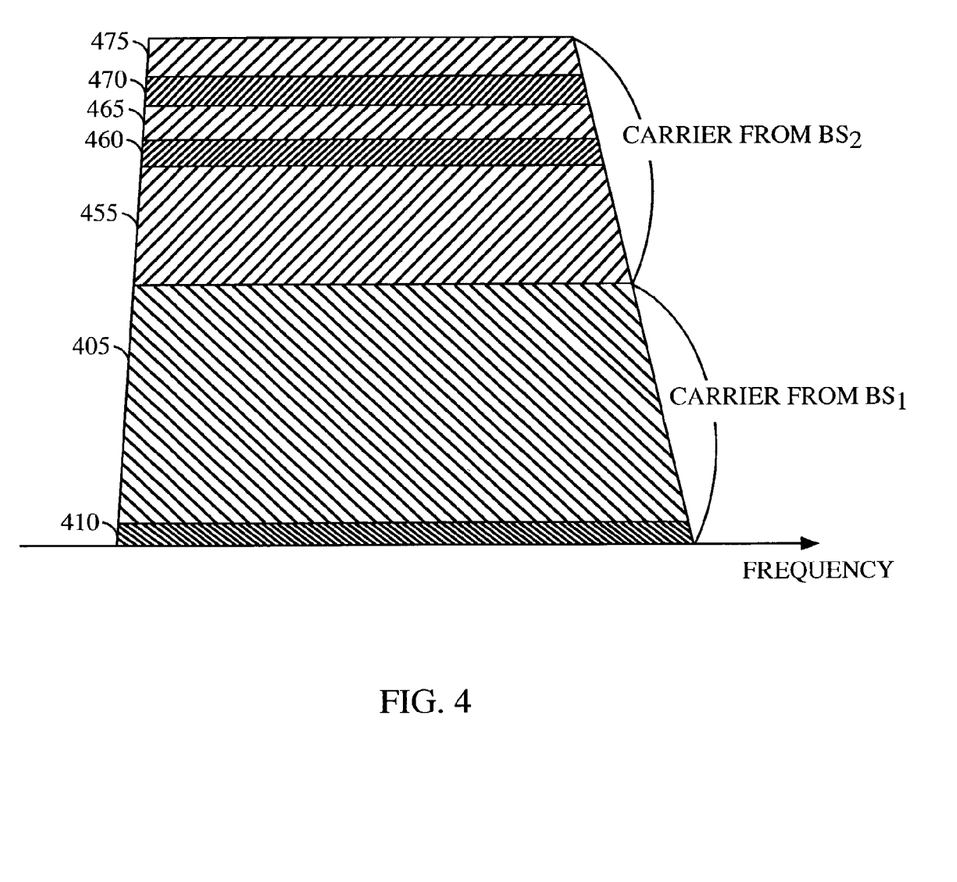
FIG. 4 is a more detailed view of code channels used for transmitting signals on one of the frequency bands in FIG. 3.

FIG. 4 is a more detailed representation of code channels used for transmitting signals on one of the illustrative frequency bands in FIG. 3. In FIG. 4, the illustrative carriers from BS1 and BS2 are on the same frequency and may use the same or different code channels. Code symbols intended for a particular mobile station can be sent by different base stations using different code channels. BS1 uses one code channel 405 and one Walsh channel 410. BS2 uses three code channels 455, 465 and 475, which are separated by two Walsh channels 460 and 470.

Figure 6:
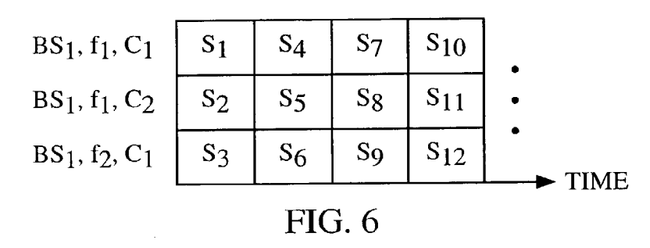

As can be seen from FIG. 6, the number of code channels on a carrier used for transmitting code symbols to a given mobile station need not be equal to the number of code channels on other carriers used for transmitting code symbols to the same given mobile station. Moreover, a given carrier can have a higher code symbol rate than other carriers that are carrying code symbols to the same mobile station on the same or different frequencies. This alleviates the problem of uneven load on the different carriers from the same base station. The ability to send code symbols at different rates on each carrier based on channel conditions and the available power on each channel allows improved utilization of channel resources because transmitting code symbols at the same rate on all channels would force all the channels to be transmitting at the same rate as the slowest channel in the system, i.e., the channel with the least power or requiring the highest signal to noise ratio. One way to allow for the transmission of code symbols at different code symbol rates on each carrier is by using a demultiplexing ratio between the different channels that is different from a 1 to 1. The demultiplexing ratio between two channels refers to the ratio of the code symbol transmission rates on the two channels. In a preferred embodiment, the resulting symbol rate on each carrier is a factor of a Walsh function rate. An alternative approach is to demultiplex the code symbols out of the encoder to the carriers directly and perform the interleaving of the repeated code symbols on each channel separately.

FIGS. 5–10 are tables showing examples of different combinations of frequencies, base stations, code channels, and code symbols used in the wireless communication system of the present invention.

Figure 5:
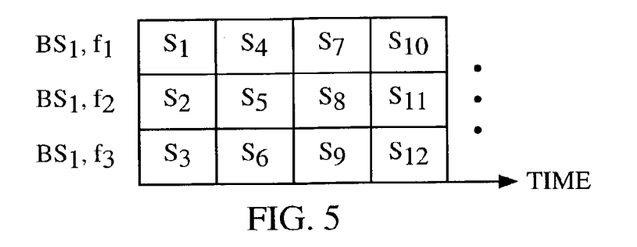
FIGS. 5–10 are tables showing examples of different combinations of frequencies, base stations, code channels, and code symbols used in the wireless communication system of the present invention.

In FIG. 5, BS1 transmits signals, in this case code symbols S1 to S12, on frequencies f1, f2, and f3. Code symbols S1, S4, S7, and S10 are transmitted on f1, while code symbols S2, S5, S8, and S11 are transmitted on f2, and code symbols S3, S6, S9, and S12 are transmitted on f3. Thus, BS1 transmits multiplexed code symbols S1 to S12 on consecutive frequencies f1, f2, and f3.

In the example of FIG. 5, the code symbol flow on the forward link remains the same before, during, and after the search. Maintaining the same code symbol flow on the forward link results in an effectively increased error-correcting coding rate. Missing code symbols or energy caused by the search are known to the receiver and are treated as erasures. Using methods and decision trees well known to those skilled in the art, depending on the resulting bit energy to noise density ratio (Eb/Nt), the fading scenario, and the awareness of the anchor base station about the search, the forward link traffic channel power for the mobile station may be increased or otherwise adjusted to ensure that the forward link quality is sufficient.

In another embodiment, the forward link code symbols intended for the mobile station are sent only on the remaining carriers, i.e., the carriers that the mobile station is still demodulating in the search mode.

It is to be noted that the above problem of missing code symbols exists when the sub receivers of the mobile station do not have a combined bandwidth that is sufficient for both receiving signals on frequencies f1, f2, and f3 and the search frequency. In some embodiments, the code symbols transmitted on frequencies f1, f2, and f3 may be received without missing code symbols while searching for signals at another frequency. For example, in the embodiment of the present invention where one subreceiver has a 3.75 MHz BPF and another subreceiver has a 1.25 MHz BPF, the subreceiver with the 3.75 MHz BPF can receive the code symbols transmitted on frequencies f1, f2, and f3 while the subreceiver with the 1.25 MHz BPF searches for signals on another frequency. In such a case, code symbols on frequencies f1, f2, and f3 would not be missed at the mobile station due to the searching by the subreceiver with the 1.25 MHz BPF. Alternatively, one 1.25 MHz subband of the 3.75 MHz BPF may be used for searching while its remaining two 1.25 MHz subbands and the 1.25 MHz BPF are used for receiving code symbols on frequencies f1, f2, and f3.

In FIG. 6, BS1 transmits code symbols on f1 and f2 using code channels C1 and C2. BS1 transmits code symbols S1, S4, S7, and S10 on f1 using code channel C1. BS1 also transmits code symbols S2, S5, S8, and S11 on f1 using code channel C2. BS1 also transmits code symbols S3, S6, S9, and S12 on f2 using code channel C1. Code channels C1 and C2 may be Walsh code channels.

In FIG. 6, BS1 uses only two frequencies f1 and f2, rather than three frequencies f1, f2, and f3 as in the example shown in FIG. 5, for transmitting code symbols S1 to S12. However, BS1, in the example of FIG. 6, uses two, rather than only one Walsh code channel as in the example shown in FIG. 5, on frequency f1. The use of more Walsh code channels allows BS1, in the example of FIG. 6, to transmit code symbols at the same rate as that in the example of FIG. 5. Thus, the code symbol throughput may be maintained by using a higher symbol rate per carrier, such as by use of more Walsh code channels per carrier. The code symbol throughput may also be reduced which would result in a higher error-correcting code rate and less redundancy.

A code symbol distribution such as that of the example shown in FIG. 6, where only two frequencies are used for transmitting code symbols to the mobile station on the forward link, allows a mobile station which can simultaneously receive signals on only three frequencies to receive code symbols on the forward link without missing code symbols due to searching on a third frequency. For example, while sub receivers tuned to frequencies f1 and f2 receive code symbols on the forward link, the subreceiver tuned to frequency f3 may be used to search for signals from other base stations or different sectors of the same base station if sectorized antennas are used.

A code symbol distribution such as that shown in FIG. 6 may also be used when the load on the frequency f3 from BS1 is relatively high and that on frequency f1 is relatively low.

Figure 7:
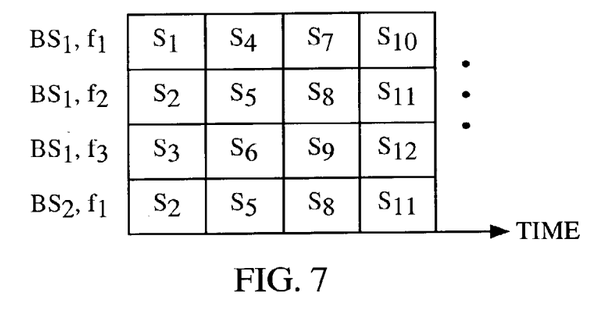

In FIG. 7, BS1 transmits code symbols S1, S4, S7, and S10 on f1, code symbols S2, S5, S8, and S11 on f2, and code symbols S3, S6, S9, and S12 on f3 while BS2 transmits code symbols S2, S5, S8, and S11 on f1. In the example of FIG. 7, some of the multiplexed code symbols, specifically code symbols S2, S5, S8, and S11, are sent by both BS1 and BS2 on f2 and f1, respectively, for increased reliability at the cost of redundancy, as BS2 does not send information additional to that sent by BS1. Such redundancy for improved reliability may be particularly appropriate in a situation where there is soft handoff between BS1 and BS2 across two different frequencies f2 and f1.

Figure 8:
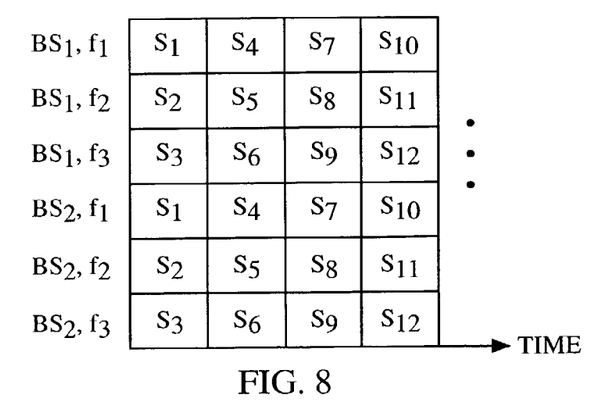

In FIG. 8, BS1 transmits code symbols S1, S4, S7, and S10 on f1, code symbols S2, S5, S8, and S11 on f2, and code symbols S3, S6, S9, and S12 on f3 while BS2 transmits code symbols S1, S4, S7, and S10 on f1, code symbols S2, S5, S8, and S11 on f2, and code symbols S3, S6, S9, and S12 on f3. In the example of FIG. 8, there is total redundancy in the code symbols transmitted by BS1 and BS2 as the code symbols transmitted by BS1 on f1, f2, and f3 are also transmitted by BS2 on the same frequencies. This increased redundancy results in increased reliability.

Figure 9:
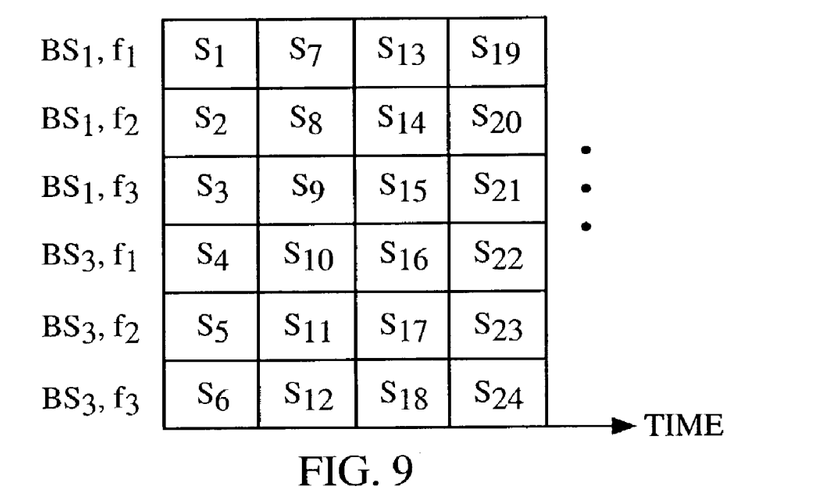

In FIG. 9, BS1 transmits code symbols S1, S7, S13, and S19 on f1, code symbols S2, S8, S14, and S20 on f2, and code symbols S3, S9, S15, and S21 on f3 while BS3 transmits code symbols S4, S10, S16, and S22 on f1, code symbols S5, S11, S17, and S23 on f2, and code symbols S6, S12, S18, and S24 on f3. In the example of FIG. 9, there is no redundancy and the increased reliability that results therefrom as the code symbols are demultiplexed onto frequencies from different base stations for increased throughput.

In FIG. 10, BS1 transmits code symbols S1, S4, S7, and S10 on f1, BS2 transmits code symbols S1, S4, S7, and S10 on f1, BS3 transmits code symbols S2, S5, S8, and S11 on f4 and code symbols S3, S6, S9, and S12 on f6, and BS4 transmits code symbols S2, S5, S8, and S11 on f4 and code symbols S3, S6, S9, and S12 on f6. In the example of FIG. 10, code symbols are demultiplexed onto different frequencies, but more than one base station transmits the same code symbols on each frequency in order to avoid interference and fading. In the example of FIG. 10, there is soft handoff between BS1 and BS2 on frequency f1. Similarly, there is soft handoff between BS3 and BS4 on frequencies f4 and f6.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A mobile station, comprising:
    a receiver including at least a first subreceiver and a second subreceiver for receiving incoming signals from at least one base station, said first subreceiver being tuned to a first frequency band and said second subreceiver being tuned to a second frequency band, wherein said second frequency band is at least twice as wide in the frequency domain as said first frequency band; and
    a demodulator, coupled to at least the second subreceiver, said demodulator including means for subdividing a first signal received by the second subreceiver into a plurality of second signals, wherein each second signal is in one of a plurality of adjacent frequency bands, said plurality of adjacent frequency bands collectively forming said second frequency band.

2. The mobile station of claim 1, wherein said second frequency band is a multiple of a bandwidth of said first frequency band.

3. The mobile station of claim 1, wherein each one of the plurality of adjacent frequency bands has a substantially equal width in the frequency domain to the first frequency band.

4. The mobile station of claim 1, wherein said demodulator includes means for subdividing the first signal received by the second subreceiver into two second signals, wherein each of the two second signals are in one of two adjacent frequency bands.

5. The mobile station of claim 1, wherein said first frequency band has a bandwidth of approximately 1.25 MHz and said second frequency band has a bandwidth that is a multiple of 1.25 MHz.

6. The mobile station of claim 1, wherein said second frequency band is three times as wide in the frequency domain as said first frequency band.

7. The mobile station of claim 1, wherein said demodulator includes means for subdividing the first signal received by the second subreceiver into three second signals, wherein each of the three second signals is in one of three adjacent frequency bands.

8. A wireless communication system, comprising:
    a plurality of base stations, wherein each of said base stations transmits signals on at least one of a plurality of frequencies;
    a plurality of mobile stations, wherein at least one of said plurality of mobile stations includes:
    a receiver including at least a first subreceiver and a second subreceiver for receiving incoming signals from at least one base station, said first subreceiver being tuned to a first frequency band and said second subreceiver being tuned to a second frequency band, wherein said second frequency band is at least twice as wide in the frequency domain as said first frequency band; and
    a demodulator, coupled to at least the second subreceiver, said demodulator including means for subdividing a first signal received by the second subreceiver into a plurality of second signals, wherein each second signal is in one of a plurality of adjacent frequency bands, said plurality of adjacent frequency bands collectively forming said second frequency band.

9. The wireless communication system of claim 8, wherein said second frequency band is a multiple of a bandwidth of said first frequency band.

10. The wireless communication system of claim 8, wherein each one of the plurality of adjacent frequency bands has a substantially equal width in the frequency domain to the first frequency band.

11. The wireless communication system of claim 8, wherein said demodulator includes means for subdividing the first signal received by the second subreceiver into two second signals, wherein each of the two second signals are in one of two adjacent frequency bands.

12. The wireless communication system of claim 8, wherein said first frequency band has a bandwidth of approximately 1.25 MHz and said second frequency band has a bandwidth that is a multiple of 1.25 MHz.

13. The wireless communication system of claim 8, wherein said second frequency band is three times as wide in the frequency domain as said first frequency band.

14. The wireless communication system of claim 8, wherein said demodulator includes means for subdividing the first signal received by the second subreceiver into three second signals, wherein each of the three second signals is in one of three adjacent frequency bands.

15. A method, comprising:

receiving signals at a first subreceiver and a second subreceiver, said first subreceiver being tuned to a first frequency band and said second subreceiver being tuned to a second frequency band, said second frequency band being at least twice as wide in the frequency domain as said first frequency band; and subdividing a first signal received by the second subreceiver into a plurality of second signals, wherein each one of said second signals is in one of a plurality of adjacent frequency bands that collectively form said second frequency band.

16. The method of claim 15, wherein said second frequency band is a multiple of a bandwidth of said first frequency band.

17. The method of claim 15, wherein each one of the plurality of adjacent frequency bands has a substantially equal width in the frequency domain to the first frequency band.

18. The method of claim 15, wherein said first frequency band has a bandwidth of approximately 1.25 MHz and said second frequency band has a bandwidth that is a multiple of 1.25 MHz.

19. The method of claim 15, wherein said second frequency band is three times as wide in the frequency domain as said first frequency band.

20. The method of claim 15, wherein said subdividing the first signal received by the second subreceiver includes subdividing the first signal into three second signals, wherein each of the three second signals is in one of three adjacent frequency bands.

21. An apparatus, comprising:

a receiver for receiving incoming signals from at least one transmission entity, including a first subreceiver being tuned to a first frequency band and a second subreceiver being tuned to a second frequency band, wherein said second frequency band is three times as wide in the frequency domain as said first frequency band; and a plurality of bandpass filters for subdividing a first signal received by the second receiver into three second signals, wherein each second signal is in one of three adjacent frequency bands, said three adjacent frequency bands collectively forming said second frequency band.

* * * * *